3,008,845
PROCESS FOR PREPARING CADMIUM RED PIGMENTS AND RESULTING PIGMENTS
Benjamin W. Allan, Bay Village, Ohio, and Frank O. Rummery, Roy W. Chrest, and Reuben Roseman, Baltimore, Md., assignors to The Glidden Company, Cleveland, Ohio, a corporation of Ohio
No Drawing. Filed Nov. 23, 1960, Ser. No. 71,159
16 Claims. (Cl. 106—301)

This invention relates to the production of novel cadmium red pigments and to a novel process for preparing them. The invention is more specifically directed to the preparation of mercury-cadmium red pigments of the pure and extended types, said pigments varying in hue from an extra-light red to a dark maroon.

This application is a continuation-in-part of copending application Serial No. 674,315, filed July 26, 1957, and now abandoned.

Cadmium sulfoselenide pigments, of the pure and extended type, have been manufactured by various processes and used for a variety of purposes. The cadmium sulfoselenides vary in hue from a light red to a deep maroon and have been prepared by dissolving selenium in a barium or sodium sulfide liquor, depending on whether a lithopone-type pigment or a pure cadmium sulfoselenide is desired, and then mixing with a cadmium sulfate solution to obtain a precipitate which is thereafter filtered, washed, calcined and then quenched, ground wet, dried and pulverized. The components of the pigment, CdS and CdSe, vary in relative proportion according to the color shade; the lighter shades contain less selenium while the darker shades contain more selenium. Regardless of the method of preparing cadmium reds, it has been necessary to incorporate varying amounts of selenium in order to impart the desired hue or color to the pigment.

It is well known that selenium constitutes a critical economic factor in the preparation of cadmium reds because of the acute shortage of this element. It would be highly desirable, therefore, if the pigment industry were provided with means for producing cadmium red pigments which are equal to or better than cadmium sulfoselenide pigments in regard to tinting strength, stability to light, heat and other desirable characteristics, without resort to the use of the scarce and expensive selenium material.

It is an object of our invention to provide a novel process for preparing novel mercury-cadmium red pigments.

It is a further object of our invention to provide a new process for preparing mercury-cadmium red pigments without resorting to the employment of selenium as a component in said pigments.

It is another object of our invention to provide a novel process and to prepare mercury-cadmium red pigment compositions in a practical and economical manner.

It is a still further object of our invention to provide the pigment industry with high-quality mercury-cadmium red pigments, which pigments can be of the pure or extended types. Additional objects will appear in the description of our invention, which follows.

Our invention is broadly concerned with the discovery that mercury can be employed as a substitute for selenium for preparing mercury-cadmium sulfide pigment products of the pure and extended types and which are substantially equal to or better than the selenium-containing red cadmium pigments with regard to certain desirable characteristics.

Heretofore, selenium-containing cadmium pigments have been prepared by producing a dried greencake by a "strike" of a sodium or barium sulfide liquor containing dissolved selenium therein, and a solution of cadmium sulfate, and then calcining at high temperatures of up to 700° C. in the presence of a preselected atmosphere in order to improve and reproduce color shade from batch to batch. The preselected atmosphere has been provided in order to eliminate losses of selenium by oxidation and also to decrease or prevent the formation of cadmium oxide which is detrimental to the color of the finished product because it produces "off-color" shades. Exemplary of preselected calcination atmospheres provided by prior workers have been those consisting of sulfur or selenium so that upon calcination oxygen is substantially excluded.

In accordance with our preferred method of preparing mercury-cadmium sulfide pigments, we have found that we can employ calcination temperatures very substantially below 700° C., can eliminate the provision of a preselected atmosphere during calcination of greencake, and can employ agents (e.g. phosphates) which are effective in imparting deeper shades to a given mercury-cadmium sulfide greencake, thereby reducing the amounts of mercury required to prepare a pigment of desired color.

We have observed that we can substantially completely overcome the detrimental effect of oxygen in the calcination step by calcining the pigment in close confinement; that is, under conditions involving substantial exclusion of oxygen. By this procedure, the provision of preselected sulfur atmosphere is eliminated, although we do not intend to imply that elemental sulfur is not present in the calcination mixture, since it is inherently present in the greencake. We can, if we so desire, calcine the pigment of our invention in conventional equipment in the presence of moderate amounts of oxygen, in which case elemental sulfur, added either in the strike or to the greencake, is desirable. Nevertheless, the addition of elemental sulfur can be omitted if desired and the calcination carried out by confining the greencake in an atmosphere as low in air or oxygen as possible. We have observed that clean and bright pigments of enhanced tinting power are produced by eliminating the addition of elemental sulfur.

By calcining in a confined atmosphere, we mean that the greencake, whether ground or unground, is confined so that its volume will so fill the chamber or vessel as to exclude any detrimental volume of air. Thus, if the calcination step is carried out by placing the greencake in a shallow depth in flat vessels and the like, the vessels are covered by any appropriate covering to exclude the atmospheric oxygen from detrimental contact with the cake. If the calcination is carried out in a rotary-type apparatus, as presently preferred, the vessel is charged with the greencake to an appropriate volume so that only an ineffective amount of air is in contact with the material to be calcined. We are not, however, limiting ourselves to this type of operation, since we can, if we desire, provide an atmosphere of sulfur during the calcining step to obtain the pigments of our invention.

In practicing our invention in both large- and small-scale operations, we prefer to carry out the calcination step at temperatures of from about 300° to 500° C. Higher or lower temperatures can be used but with an attendant reduction in efficiency and/or quality of the pigment produced.

In our operations, we have observed that if the calcination is carried out in a rotary-type calciner, for example, a rotary drum and the like, there is a decided reduction or elimination of poor heat transfer and resulting overheating problems. We obtain gratifying results by calcining batches of 100 pounds or over at temperatures below 500° C., for example, 420° C. for one hour, or 480° C. for fifteen minutes. Other calcinations have been carried out satisfactorily at a temperature of about 385° C. for one hour.

Also, as indicated heretofore, we have found that darker shades, from a given mercury-cadmium sulfide greencake, could be promoted by incorporating a treating agent, such as a phosphate, in the greencake prior to calcination. Amounts ranging from about 0.4 to 0.8 percent by weight, calculated as $P_2O_5$, based on the weight of the calcined greencake, yield significant results without impairing the quality of the pigment.

Although we have indicated the general nature of our invention and the type of pigments produced thereby, the methods by which we can accomplish or attain our objects fall into several embodiments, as illustrated by the following:

(1) An alkali metal or alkaline earth metal sulfide solution is treated with a mercury compound, such as the nitrate, and with or without elemental sulfur. The resulting clear solution is thereafter reacted with an aqueous cadmium salt solution, thereby producing a precipitate containing cadmium, mercury and sulfur. The washed product is favorably calcined to produce a red pigment.

(2) An alkaline earth sulfide solution is treated with a mercury compound and elemental sulfur prior to interaction with an aqueous solution of a cadmium salt. The washed product is favorably calcined to produce a red pigment.

(3) An alkali or alkaline earth metal sulfide solution is treated with elemental sulfur and reacted with a cadmium salt solution containing a mercury compound, thereby producing a precipitate which is thereafter washed and calcined as in (1) and (2) above.

(4) An alkali or alkaline earth metal sulfide solution is reacted with a cadmium salt solution containing a mercury compound dissolved therein to thereby produce a precipitate. To the washed product, elemental sulfur is added prior to the calcination step or, alternatively, elemental sulfur can be omitted.

(5) Individually derived mercury sulfide and cadmium sulfide are mixed intimately, with or without elemental sulfur, and the mixture is favorably calcined to produce a red pigment.

(6) A cadmium sulfide-forming material and a mercury sulfide-forming material in admixture with elemental sulfur are calcined to produce a red pigment.

In practice the preferred embodiment of our invention as set forth in (1) above, our preferred procedure for obtaining a greencake precipitate embodies the following steps: Metallic mercury is first dissolved in an aqueous solution of nitric acid and the resulting acidic solution is added slowly, and with vigorous mechanical agitation, to a previously prepared aqueous alkali metal sulfide or alkaline earth metal sulfide solution containing appropriate amounts of hydroxide and sulfide ions to yield an OH:SH ratio of about 1 to 1. The mixed sulfide-mercury nitrate solution is in turn added, with vigorous agitation, to a solution of cadmium sulfate containing the requisite amount of cadmium. Under these conditions, a coprecipitation occurs wherein mercury sulfide and cadmium sulfide (with or without alkaline earth metal sulfate) are precipitated in an extremely intimate substantially-unpeptized mixture. The precipitate is filtered, washed to remove soluble salts, dried and calcined. The pigment is calcined to the exclusion of extraneous gases to within a temperature range of about 300° to 500° C.

Although the above sets forth the preferred procedure employed in obtaining our pigment product, we can also employ certain preferred conditions for preparing said pigments. These conditions, while desirable for our process and product, however, are not to be construed as limitations of our invention. They are: (1) The metallic mercury is preferably dissolved in a 1:1 solution of nitric acid which is then diluted still further prior to incorporation into the sodium sulfide solution. We describe using nitric acid as the solvent for mercury, but we mean to include within the scope of our invention other equivalent materials such as combinations of other acids and oxidizing agents which provide benefits similar to those obtained by the use of nitric acid. Such a combination, for example, might be hydrochloric acid and ammonium nitrate. Other materials may also be employed and these will be obvious to those skilled in the art. (2) The concentration of the sulfide solution corresponds ordinarily and preferably to about 20 to 50 grams sulfide ion per liter. (3) The concentration of the cadmium sulfate solution corresponds ordinarily to about 140 grams of cadmium per liter, and the pH is normally about 5.5. (4) The ratio OH:SH in the original, unadjusted, alkali metal or alkaline earth sulfide solution is normally 1.0:1.0 and this ratio was present in all the starting sulfide solutions of our examples, but if in preparing the nitric acid solution of mercury of our preferred procedure a ratio of $HNO_3$:Hg is employed outside the applicable range stated in our table, as in Examples 2 and 6–6, it will be necessary, for best results, to adjust the OH:SH ratio of the alkali metal or alkaline earth sulfide solution, i.e., the alkalinity relative to sulfide ion content, in keeping with the degree of deviation from the range of $HNO_3$ usage stated in the table. Conversely if, for example, sodium sulfide solution of OH:SH ratio widely different from 1.0:1.0 is employed it may be necessary to provide a ratio of $HNO_3$:Hg in the mercury-containing solution which will stoichiometrically compensate for this deviation of the OH:SH ratio in the sodium sulfide solution. It is to be understood that such compensating adjustments, for the OH:SH ratio in the sodium sulfide solution and the $HNO_3$:Hg ratio in the mercury-containing nitric acid solution, are all within the scope of our invention, and our Examples 2 and 6–9 are illustrative of a type of deviation in $HNO_3$:Hg ratio and a desirable adjustment therefor of the OH:SH ratio in the alkaline sulfide solution which permits optimum results to be obtained. Optimum results are obtained in our process when the $HNO_3$:Hg and OH:SH ratios are so adjusted that upon adding the nitric acid solution of mercury to an alkaline sulfide solution the mercury remains dissolved. A deficiency in the amount of nitric acid present in the mercury-containing solution results in metallic mercury separating from the alkaline sulfide solution. An excess of nitric acid present in this mercury-containing solution beyond the amount stated in the table and without a compensating adjustment in the OH:SH ratio of the alkaline sulfide solution results in the formation of a mercury sulfide precipitate upon the addition of the mercury-containing solution to the alkaline sulfide solution. Slight amounts of either metallic mercury or mercury sulfide are not particularly harmful to our pigment product, but too great an amount of either of these materials should be avoided in order that conditions be most favorable for the subsequent coprecipitation of mercury sulfide and cadmium sulfide. The OH:SH ratio of an alkaline sulfide solution may be expressed as the ratio between the number of moles of alkali metal- or alkaline earth-hydroxide and the number of moles of alkali metal- or alkaline earth-hydrosulfide contained therein.

It is possible to employ ratios of OH:SH in the alkaline sulfide solutions much greater than 1.0:1.0, and compensation for these high ratios can be made by adding nitric acid, or equivalent amounts of other acid, to the alkaline sulfide solution, or to the cadmium salt solution, or to the mercury-containing nitric acid solution, and acid-alkaline compensations according to this general principle are demonstrated in our Examples 2, 6, 7, 8, and 9. The maximum OH:SH ratio which can be effectively employed without compensation by the addition of acid is one which gives rise to a pH value upwards of 9 or 10 in the raw pigment precipitate resulting from its use, and particularly is one above which partial peptization of the precipitate occurs. Also, we have found that some latitude can be tolerated in the use of high OH:SH ratio alkaline sulfide solutions according to the pH of the cadmium salt solution employed as well as the HNO₃:Hg ratio of the mercury-nitric acid solution. In our examples we employ cadmium salt solutions having pH values in the range of 5 to 6, and in our discussions we refer only to such solutions unless otherwise stated. In conjunction with cadmium salt solutions of pH values within this range and mercury-nitric acid solutions within the ranges stated in the table we are able to use successfully for our purpose alkaline sulfide solutions possessing OH:SH ratios as high as 1.5:1.0 to 1.9:1.0 depending on the pigment hue to be produced. In the employment of strongly acidic cadmium salt solutions and/or mercury-nitric acid solutions in which the HNO₃:Hg ratios are above those shown in the table, alkaline sulfide solutions of still higher OH:SH ratios can be effectively employed, and these solutions may contain excess alkaline hydroxide stoichiometrically equivalent to any excesses of acid such as those above described.

In addition to the above-described uses of alkaline sulfide solutions of high OH:SH ratio, we may successfully employ, also, solutions of relatively low OH:SH ratio. In using solutions of low OH:SH ratio, we may compensate therefor by reducing the HNO₃ employed in preparing the mercury-containing nitric acid solution by an amount stoichiometrically corresponding to the reduction in the alkaline hydroxide content of the alkaline sulfide solution below that corresponding to an OH:SH ratio of 1.0:1.0. The lowest OH:SH ratio which can be employed effectively by this means of compensation is in the range of 0.20:1.0 to 0.40:1.0 depending on the pigment hue to be produced.

Practical working ranges for the OH:SH ratios of the alkaline sulfide solutions are approximately as follows:

| | Low Limit | High Limit |
|---|---|---|
| Light Red | 0.20:1.0 | 1.9:1.0 |
| Medium Light Red | 0.25:1.0 | 1.8:1.0 |
| Medium Red | 0.30:1.0 | 1.7:1.0 |
| Deep Red | 0.35:1.0 | 1.6:1.0 |
| Maroon | 0.40:1.0 | 1.5:1.0 |

(5) In dissolving the mercury, relatively dilute solutions of nitric acid are employed, since the use of concentrated solution results in some unnecessary decomposition and loss of HNO₃. In an instance where nitric acid is lost, it is necessary to compensate for this deficiency by adding extra acid, as required, so that the mercury-containing solution actually contains nitric acid and mercury dissolved therein in amounts corresponding to a ratio HNO₃:Hg within the range indicated in our table as applicable in this instance. This, as well as other ratios and relationships which are applicable in producing various mercury containing cadmium sulfide pigments in the range of light red to maroon color or hue by means of the invention, are set forth in the table. The tinting strength of each pigment prepared according to procedures described in the examples and within the limits shown in the table was superior to that of the standard cadmium sulfoselenide pigment with which it was compared.

Higher ratios of S⁻⁻:Cd than those indicated in the table, though wasteful of sulfide, are also operable and come within the scope of our invention.

While we do not want to be bound by the theory here expressed in explanation of the above discussions, we believe that our use of a mercury-containing nitric acid solution, and its premixing with an alkaline sulfide solution, brings about the in-situ formation of a mercury sulfide complex ion in the alkaline sulfide solution of our system, which ion may be represented by the formula $HgS_2^{--}$. This ion can be undesirably converted to insoluble HgS by employing acid beyond the upper limits expressed in our table. The following reactions illustrate formation of the postulated complex ion from a type of aqueous alkaline sulfide solution and our mercury-containing nitric acid solution, under the conditions of our invention and within the limits stated in the table:

(a) $\quad Na_2S + H_2O \rightleftharpoons NaOH + NaSH$ (b) $Hg(NO_3)_2 + 2NaOH + 2NaSH \rightleftharpoons$
$\quad Na_2HgS_2 + 2NaNO_3 + 2H_2O$ The above-indicated mercury salt is ionized in our alkaline sulfide solution, as follows:

(In alkali sulfide medium)

(c) $\quad Na_2HgS_2 \rightleftharpoons 2Na^+ + HgS_2^{--}$

In the presence of excess nitric or equivalent other acid, alkalinity essential for the preservation of the $HgS_2^{--}$ complex ion formed in Reactions b and c is neutralized, and this results in decomposition of the complex ion and in undesirable precipitation of insoluble HgS, as follows:

$Na_2HgS_2$ (soluble in alkaline sulfide medium)
$\quad + 2HNO_3 \rightleftharpoons HgS$ (insoluble) $+ H_2S + 2NaNO_3$ Thus, it is expedient to provide free alkali- or alkaline earth-hydroxide capable of neutralizing any excess of free nitric acid above the limits stated in the table. This hydroxide can be conveniently provided by adjusting the OH:SH ratio of the starting alkaline sulfide solution, or by any of the techniques described above. By providing sufficient alkalinity to neutralize any excesses of free acid above the amounts of acid stated in the table, one prevents the precipitation of HgS to any noteworthy extent prior to the strike. Alternatively, by providing acidity sufficient to neutralize any excesses of alkalinity beyond the upper limits shown above for OH:SH ratios, one prevents peptization of the ultimate coprecipitate of HgS and CdS. Thus, what has been described hereinabove in respect to useful OH:SH ratios is in its simplest terms the application of acid-alkaline neutralization for eliminating undesired side effects resulting from large excesses of free nitric and/or equivalent amounts of other acid.

In the practice of our invention, best results are obtained by the method wherein the mercury-containing alkaline sulfide solution is interacted with the cadmium salt solution under mildly acidic conditions. In this respect our teaching is contrary to any teaching wherein mercury-cadmium salt solution is added to alkaline sulfide solution so that the coprecipitate is formed under quite strongly alkaline conditions. Thus, by forming our coprecipitate under mildly acidic conditions, we have unexpectedly ob-

TABLE

| Color of Product | Weight Ratio, Hg:Cd | Weight Ratio, HNO₃:Hg | | Weight Ratio, S⁻⁻:Cd | Grams | | Grams HNO₃ | | Grams | |
|---|---|---|---|---|---|---|---|---|---|---|
| | | Low Limit | High Limit | | Cd | Hg | Low Limit | High Limit | S⁻⁻ | NaOH |
| Light Red | 0.20:1.0 | 1.0:1.0 | 3.75:1.0 | 0.35:1.0 | 37.0 | 7.4 | 7.4 | 27.8 | 12.9 | 16.1 |
| Medium Light Red | 0.24:1.0 | 0.98:1.0 | 3.2:1.0 | 0.36:1.0 | 37.0 | 8.9 | 8.7 | 28.5 | 13.3 | 16.6 |
| Medium Red | 0.29:1.0 | 0.95:1.0 | 2.7:1.0 | 0.37:1.0 | 37.0 | 10.7 | 10.2 | 28.9 | 13.7 | 17.1 |
| Deep Red | 0.33:1.0 | 0.93:1.0 | 2.4:1.0 | 0.37:1.0 | 37.0 | 12.2 | 11.4 | 29.3 | 13.7 | 17.1 |
| Maroon | 0.37:1.0 | 0.9:1.0 | 2.15:1.0 | 0.37:1.0 | 37.0 | 13.7 | 12.3 | 29.5 | 13.7 | 17.1 | tained a material which gives rise to a superior red pigment product upon calcination.

Although it is not necessary for the production of good quality pigments, it may be advisable, as a preventive measure against corrosion of ordinary plant filtering and washing equipment, to treat the precipitate-slurries with minor amounts of alkali prior to filtering and washing to secure a pH moderately close to neutrality. Except for this purpose, the addition of alkali to the finished slurries has no bearing on either the operability of our red pigment process or the quality of the pigment products.

In order that our invention can be more fully understood by those concerned, reference is made to the following examples which illustrate the preparation of our pigment products. Again, it should be understood that the examples should not be viewed as limiting our invention to the specific values disclosed.

*Example 1*

A light red pigment was prepared by the following procedure. One hundred thirty-two pounds of metallic mercury was dissolved in 77 gallons of nitric acid at a concentration of 494.6 grams of nitric acid per liter. After the dissolution of the mercury was complete, 38 additional gallons of water was added to the acidic solution. The quantity of nitric acid used thus represented a weight ratio of $HNO_3:Hg$ of 2.4:1.00. The acidic solution containing the dissolved mercury was added slowly, and with good agitation, to 754 gallons of an aqueous sodium sulfide solution at a concentration of 35.8 grams of sulfide ion ($S^{--}$) per liter. The resulting mercury-containing sodium sulfide solution was clear and was added slowly, and with good agitation, to 568 gallons of a cadmium sulfate solution at a concentration of 140 grams of cadmium per liter, which is equivalent to 666 lbs. of cadmium. After all of the mercury-containing sodium sulfide solution had been added, the filtrate from the resulting precipitate slurry was tested and found to contain a small amount of cadmium ion ($Cd^{++}$). Twelve gallons of sodium sulfide solution (plain and without mercury), at a concentration of 45.4 grams sulfide ion per liter, was required (as "touch-up") to precipitate this remaining cadmium. Thus, the total amount of sulfide ion used in this strike was 229.5 lbs. The quantity of mercury in relationship to the cadmium employed represented a weight ratio of Hg:Cd of 0.198:1.00, and the total amount of sulfide ion to cadmium a weight ratio of $S^{--}$:Cd of 0.344:1.00. The pH of the slurry was raised to 6.9 by adding 81 lbs. of sodium hydroxide.

The total reactants used in this example were as follows:

| | |
|---|---|
| Metallic mercury | 132 lbs. |
| Nitric acid (45.3 gals., 40° Bé.) | 317 lbs. (100%). |
| Sulfide ion (754 gals. of Na₂S solution of 35.8 g. $S^{--}$ per liter plus 12 gals. of 45.4 g. $S^{--}$ per liter) | 229.5 lbs. |
| Cadmium (568 gals. of CdSO₄ solution having a concentration of 140 g. Cd per liter) | 666 lbs. |
| Sodium hydroxide (about 200 g. per liter) | 81 lbs. |

The precipitate slurry was filtered and washed until a test of the wash water for sulfate ion was negative. The washed cake was then repulped with water, dewatered and dried. The product was then calcined in a closed rotary drum calciner, thus practically excluding air, at a temperature of 385° C. for a time of 70 minutes. The resulting calcined pigment was blended with 1,750 pounds of blanc fixe and, when so extended, resulted in a bright, clean, light red pigment.

*Example 2*

A maroon pigment was prepared by dissolving 249 pounds of metallic mercury in 146 gallons of aqueous nitric acid at a concentration of 494.6 grams $HNO_3$ per liter. After complete dissolution of mercury, an additional 72 gallons of water was added. The quantity of nitric acid represented a weight ratio of $NHO_3:Hg$ of 2.4:1.00.

To 753 gallons of a sodium sulfide solution at a concentration of 42.9 grams of sulfide ion per liter, there was added 15 gallons of sodium hydroxide solution which contained 62.5 lbs. of sodium hydroxide. The acidic solution containing the dissolved mercury was then added slowly, and with good agitation, to this sodium sulfide solution. The resulting mercury-containing sodium sulfide solution was clear and was added slowly, and with good agitation, to 568 gallons of a cadmium sulfate solution at a concentration of 140 grams of cadmium per liter, which is equivalent to 666 lbs. of cadmium. After the addition of all the mercury-containing sodium sulfide solution, the filtrate from the resulting precipitate slurry was tested and was found to contain cadmium ions. To precipitate this remaining cadmium, 35.2 gallons of sodium sulfide solution (plain and without mercury) was added. Thus, in this strike, the relationship of mercury to cadmium employed represented a weight ratio of Hg:Cd of 0.375:1.00, and the total amount of sulfide ions used was 280 lbs. The pH of the slurry was raised to 6.9 by adding 5 lbs. of sodium hydroxide in the form of a 200-gram-per-liter solution. The total reactants used in this example were as follows:

| | |
|---|---|
| Metallic mercury | 249 lbs. |
| Nitric acid (85.7 gallons of 40° Bé.) | 598 lbs. (100%). |
| Sulfide ion (788 gallons of Na₂S solution of 42.9 g. $S^{--}$ per liter) | 280 lbs. |
| Cadmium (568 gallons of CdSO₄ solution of 140 g. Cd per liter) | 666 lbs. |
| Sodium hydroxide | 67.5 lbs. |

The precipitate slurry was filtered and washed until a test of the wash water for sulfate ions was negative. The washed cake was then repulped with water, dewatered and dried. The resulting product was then calcined in a rotary drum calciner in a close confinement so that practically all air was excluded and at a temperature of 385° C. for a time of 70 minutes. The resulting calcined product was blended with 3,090 lbs. of blanc fixe and, when so extended, produced a high-quality maroon pigment.

*Example 3*

In this example a simultaneous precipitation was performed. To 40 cc. of a 1:1 solution of concentrated nitric acid and water, there was added and dissolved 8.65 grams of elemental mercury. This represents a weight ratio of $HNO_3:Hg$ of 2.3:1.00. To 325 cc. of a sodium sulfide solution having an OH:SH ratio of 1.0:1.0 and a sulfide ion concentration of 35.6 grams per liter, there was added 1.2 grams of elemental sulfur. The acidic mercury nitrate solution was then incorporated into the sodium sulfide solution to form a clear solution. Thereafter 264 cc. of a cadmium sulfate solution at a conentration of 140 g. Cd per liter and the clear, mercury-containing sodium sulfide solution were brought together, slowly and simultaneously. The pH throughout the precipitation was maintained at approximately 7. However, upon adding all of the mercury nitrate-sodium sulfide solution, there still remained, unused, 75 cc. of the cadmium sulfate solution. Therefore, a 20-cc. portion of the original sodium sulfide solution containing neither mercury nor elemental sulfur was added along with the final 75 cc. of cadmium sulfate. The resulting precipitate was filtered and washed with three portions of water of 650 cc. each. The precipitate was dried and ground and calcined in a tube furnace with the temperature being allowed to rise to 475° C. in 18 minutes. The calcined product was a pure red pigment of good quality.

Example 4

In this example a barium sulfate-extended mercury-containing cadmium red pigment was prepared.

To 62 cc. of nitric acid, prepared by diluting 20.7 cc. of concentrated nitric acid with water, there was added and dissolved 8.9 grams of elemental mercury. The resulting acidic mercury nitrate solution was then added, with vigorous agitation, to 370 cc. of a solution of barium sulfide, the concentration of which was 36.5 grams sulfide ion per liter. The resulting clear, mercury-containing barium sulfide solution was added, slowly and with agitation, to 264.5 cc. of a cadmium sulfate solution at a concentration of 140 grams of cadmium per liter. There resulted a co-precipitation of mercury sulfide and cadmium sulfide along with barium sulfate. A final 20-cc. portion of barium sulfide solution, which contained no mercury, was added to precipitate some unreacted cadmium ions. At this point the pH was 4.2. This was raised to 7.0 by the addition of 2.5 cc. of a 200-gram-per-liter sodium hydroxide solution. The precipitate was filtered, washed, dried and calcined at 385° C. for one hour in close confinement, with substantial exclusion of air, to yield a red pigment product of good quality.

Example 5

In this example a barium sulfate-extended pigment was prepared by employing separately-derived mercury sulfide and cadmium sulfide-barium sulfate.

To 0.93 gram of a commercial red cinnabar (HgS), there was added 0.39 gram of elemental sulfur, and the two were intimately mixed. To this mixture there was then added 41.0 grams of a previously prepared raw pigment (61.4% $H_2O$), comprising intimately mixed cadmium sulfide and barium sulfate. This latter raw pigment was the result of the interaction of solutions of cadmium sulfate (140 g. Cd/liter) and barium sulfide (36.5 g. sulfide ion per liter). The mixture was dried, ground and calcined as in Example 3 to yield a clean, bright red pigment product.

It has already been pointed out that in our invention we can best carry out the preparation of mercury-containing cadmium red pigments either with or without the addition of elemental sulfur, depending on the lesser or greater extent to which oxygen is excluded from the calcination. Where calcination is conducted under our preferred conditions, namely, in a confined atmosphere to the substantial exclusion of air, products of higher tinting strengths are produced where very little or no elemental sulfur is added. This is demonstrated by the following examples.

Example 6

The object in this example was to prepare a mercury-containing cadmium red pigment by employing an amount of added elemental sulfur stoichiometrically equivalent to the mercury employed.

To 31.3 cc. of a concentrated, reagent grade nitric acid in the form of a 1:1 aqueous solution, there was added and dissolved 13.5 grams of metallic mercury. In 385 cc. of a solution of sodium sulfide of a concentration of 35.8 g. sulfide ion per liter, there were dissolved 7.1 grams of sodium hydroxide and 2.1 grams of elemental sulfur. The acidic solution containing the dissolved mercury was then added slowly, with vigorous agitation, to the sodium sulfide solution. The resulting mercury-containing sodium sulfide solution was crystal clear and had a pH of 12.0. This solution was then added slowly and with agitation to 265 cc. of a cadmium sulfate solution at a concentration of 140 grams cadmium per liter, which concentration and volume are equivalent to 37 grams of cadmium. The pH of the cadmium sulfate solution was 5.6. The pH of the coprecipitate slurry which formed dropped slowly to a low of 4.15. The pH of the slurry was then raised to 7.0 by adding 1.6 cc. of a sodium hydroxide solution at a concentration of 200 grams per liter.

In the above reaction, it will be noted that the quantity of mercury employed in relation to the cadmium represents a ratio by weight of Hg:Cd of 0.365:1.00, and the quantity of nitric acid represents a weight ratio of $NHO_3$:Hg of 2.3:1.00.

The precipitate was filtered, washed with four volumes of $H_2O$, and dried. The dry greencake was ground in a mortar with a pestle and then calcined for one hour at 385° C. in a closed crucible (i.e., wrapped in aluminum foil) in an electric muffle furnace.

Example 7

The same technique and proportions of reactants were used in this example as in Example 6, except that the amount of elemental sulfur added was reduced to 0.535 gram. The finished pigment had a tinting strength superior to that of Example 6.

Example 8

The same technique and proportions of reactants were used in this example as in Example 6, except that the elemental sulfur added was reduced to 0.214 gram. The tinting strength of the resulting pigment was higher than that of Example 6 or Example 7.

Example 9

The same technique as in Example 6 was employed, except that the ratio of Hg:Cd was increased to 0.370:1.00 with an accompanying increase in nitric acid and sodium hydroxide. No elemental sulfur was added. The tinting strength of the resulting pigment was higher than that of Example 6 or Example 7.

From the above experiments, it was concluded that the addition of elemental sulfur is unnecessary when practicing the preferred method of calcination of our invention, which method is to calcine the pigment in close confinement to the substantial exclusion of oxygen. In such calcinations, the pigment can be calcined either in the ground or unground state in a closely confined rotary vessel type of apparatus to aid in heat transfer problems, or spread out over a large surface, i.e., a shallow bed under quiescent conditions, with an appropriate cover thereover to thus admit as little oxygen as possible or to exclude oxygen entirely.

Example 10

In producing a light red pigment, a nitric acid solution of mercury was prepared employing near the minimum amount of $HNO_3$ required to retain the mercury in solution upon its incorporation into sodium sulfide solution. Thus, 7.4 g. of metallic mercury was dissolved in 8.2 cc. of concentrated nitric acid diluted to 16.4 cc. After the dissolution of the mercury was complete, 8.2 cc. additional water was added to the solution. In this instance, the weight ratio $HNO_3$:Hg was 1.1:1.0. The solution containing the dissolved mercury was added slowly, and with good agitation, to 360 cc. of an aqueous sodium sulfide solution having a sulfide ion concentration of 35.8 grams per liter and an OH:SH ratio of 1.0:1.0. The resulting clear mercury-containing sodium sulfide solution was then added slowly, and with good agitation, to 264.5 cc. of a cadmium sulfate solution at a concentration of 140 grams Cd per liter, which is equivalent to 37 grams of cadmium. Thus, the quantity of mercury employed relative to the cadmium represented a weight ratio of Hg:Cd of 0.2:1.0. The precipitate slurry was filtered and washed until a test of the wash water for sulfate ion was negative. The washed cake was then repulped with water, dewatered, and dried. The product was calcined at 385° C. for one hour, in close confinement, with substantial exclusion of air, to yield a red pigment of good quality.

Example 11

In producing a light red pigment, a nitric acid solution of mercury was prepared employing near the maximum amount of $HNO_3$ which would permit the mercury to remain in solution but not sufficient to allow substantial precipitation of mercury sulfide upon incorporation of the mercury solution into sodium sulfide solution. Thus, 7.4 g. of metallic mercury was dissolved in 27.2 cc. of concentrated nitric acid diluted to 54.4 cc. After the dissolution of the mercury was complete, 27.2 cc. additional water was added to the solution. In this instance, the weight ratio $HNO_3$:Hg was 3.65:1.00. The solution containing the dissolved mercury was added slowly, and with good agitation, to 360 cc. of an aqueous sodium sulfide solution having a sulfide ion concentration of 35.8 grams per liter and an OH:SH ratio of 1.0:1.0. The resulting nearly clear mercury-containing sodium sulfide solution was then added slowly, and with good agitation, to 264.5 cc. of a cadmium sulfate solution at a concentration of 140 grams Cd per liter, which is equivalent to 37 grams of cadmium. Thus, the quantity of mercury employed relative to the cadmium represented a weight ratio of Hg:Cd of 0.2:1.0. The precipitate slurry was filtered and washed until a test of the wash water for sulfate ion was negative. The washed cake was then repulped with water, dewatered, and dried. The product was calcined at 385° C. for one hour in close confinement, with substantial exclusion of air, to yield a red pigment of good quality.

Example 12

In producing a maroon pigment, a nitric acid solution of mercury was prepared employing near the minimum amount of $HNO_3$ required to retain the mercury in solution upon its incorporation into the sodium sulfide solution. Thus, 13.7 g. of metallic mercury was dissolved in 13.8 cc. of concentrated nitric acid diluted to 27.6 cc. After the dissolution of the mercury was complete, 13.8 cc. additional water was added to the soluiton. In this instance, the weight ratio $HNO_3$:Hg was 1.0:1.0. The solution containing the dissolved mercury was added slowly, and with good agitation, to 383 cc. of an aqueous sodium sulfide solution having a sulfide ion concentration of 35.8 grams per liter and an OH:SH ratio of 1.0:1.0. The resulting clear mercury-containing sodium sulfide solution was then added slowly, and with good agitation, to 264.5 cc. of a cadmium sulfate solution at a concentration of 140 grams Cd per liter, which is equivalent to 37 grams of cadmium. Thus, the quantity of mercury employed relative to the cadmium represented a weight ratio of Hg:Cd of 0.37:1.00. The precipitate slurry was filtered and washed until a test of the wash water for sulfate ion was negative. The washed cake was then repulped with water, dewatered, and dried. The produce was calcined at 385° C. for one hour, in close confinement, with substantial exclusion of air, to yield a red pigment of good quality.

Example 13

In producing a maroon pigment, a nitric acid solution of mercury was prepared employing near the maximum amount of $HNO_3$ which would permit the mercury to remain in solution but not sufficient to allow substantial precipitation of mercury sulfide upon incorporation of the mercury solution into the sodium sulfide solution. Thus, 13.7 g. of metallic mercury was dissolved in 27.6 cc. of concentrated nitric acid diluted to 55.2 cc. After the dissolution of the mercury was complete, 27.6 cc. additional water was added to the solution. In this instance, the weight ratio $HNO_3$:Hg was 2.0:1.0. The solution containing the dissolved mercury was added slowly, and with good agitation, to 383 cc. of an aqueous sodium sulfide solution having a sulfide ion concentration of 35.8 grams per liter and an OH:SH ratio of 1.0:1.0. The resulting nearly clear mercury-containing sodium sulfide solution was then added slowly, and with good agitation, to 264.5 cc. of a cadmium sulfate solution at a concentration of 140 grams Cd per liter, which is equivalent to 37 grams of cadmium. Thus, the quantity of mercury employed relative to the cadmium represented a weight ratio of Hg:Cd of 0.37:1.00. The precipitate slurry was filtered and washed until a test of the wash water for sulfate ion was negative. The washed cake was then repulped with water, dewatered, and dried. The product was calcined at 385° C. for one hour, in close confinement, with substantial exclusion of air, to yield a red pigment of good quality.

Example 14

In this example, mercuric nitrate was used as a starting material, and an amount of nitric acid was employed such that the total nitrate contained in the resulting nitric acid solution of mercury, including that derived from the mercuric nitrate, provided nitrate equal to a ratio of $HNO_3$:Hg of 2.3:1.0. To 12.63 g. $Hg(NO_3)_2 \cdot H_2O$, which is equivalent to 7.4 g. Hg and 4.65 g. $HNO_3$, there was added 24.6 cc. of a solution containing 12.37 g. $HNO_3$, and the mixture was stirred until the mercuric nitrate was dissolved. This solution was added slowly, and with good agitation, to 360 cc. of an aqueous sodium sulfide solution having a sulfide ion concentration of 35.8 grams per liter and an OH:SH ratio of 1.0:1.0. The resulting clear mercury-containing sodium sulfide solution was then added slowly, and with good agitation, to 264.5 cc. of a cadmium sulfate solution at a concentration of 140 grams Cd per liter, which is equivalent to 37 grams of cadmium. Thus the quantity of mercury employed relative to the cadmium represented a weight ratio of Hg:Cd of 0.20:1.0. The precipitate slurry was filtered and washed until a test of the wash water for sulfate was negative. The washed cake was then repulped with water, dewatered, and dried. The product was calcined at 385° C. for one hour, in close confinement, with substantial exclusion of air, to yield a light red pigment of good quality.

Example 15

In this example, mercurous nitrate was used as a starting material, and an amount of nitric acid was employed such that the total nitrate contained in the resulting nitric acid solution of mercury, including that derived from the mercurous nitrate, provided nitrate equal to a ratio of $HNO_3$:Hg of 1.5:1.0. To 19.16 g. $HgNO_3 \cdot H_2O$, which is equivalent to 13.7 g. Hg and 4.3 g. $HNO_3$, there was added 41.4 cc. of a solution containing 16.25 g. $HNO_3$, and the mixture was stirred to complete dissolution of the salt. This solution was added slowly, and with good agitation, to 383 cc. of an aqueous sodium sulfide solution having a sulfide ion concentration of 35.8 grams per liter and an OH:SH ratio of 1.0:1.0. The resulting clear mercury-containing sodium sulfide solution was then added slowly, and with good agitation, to 264.5 cc. of a cadmium sulfate solution at a concentration of 140 g. Cd per liter, which is equivalent to 37 grams of cadmium. Thus, the quantity of mercury employed relative to the cadmium represented a weight ratio of Hg:Cd of 0.37:1.0. The precipitate slurry was filtered and washed until a test of the wash water for sulfate ion was negative. The washed cake was then repulped with water, dewatered, and dried. The product was calcined at 385° C. for one hour, in close confinement, with substantial exclusion of air, to yield a maroon pigment of good quality.

In further modification of our novel process and pigment product, it was found that the use of certain treating agents of the class of phosphates could be employed in promoting formation of darker shades from a given cadmium-mercury sulfide greencake. By adding small amounts of such treating agents prior to calcination, deeper shades or hues were obtained in addition to savings in mercury costs by reducing the amounts of this element employed.

In calcining a greencake of a mercury-cadmium sulfide pigment containing from 0.75 to 1.34 percent by weight (on a calcined pigment basis) of di-basic ammonium phosphate, for example, it was found that calcination temperatures of the order of 460° C. for one hour yielded very satisfactory results. Darker shades were obtained from the same greencake when the ammonium phosphate was added as compared to the results obtained when it was omitted. Thus, by adding the ammonium phosphate, the same degree of darkness or shade can be obtained through the use of less mercury in the strikes than would otherwise be the case. The phosphate compound can be added in various ways, e.g. as an aqueous solution to a dried greencake, the cake then being redried and calcined; or it can be added to the wet greencake prior to drying and calcining; or it can be added in the dry state to the dried greencake before calcining.

*Example 16*

In this example, a phosphate was added to the pigment prior to calcination. A washed raw pigment preciptate was prepared exactly according to the procedure of Example 1, and to the wet greencake was added a solution containing 0.65% mono-basic ammonium phosphate on the basis of the solids contained therein. The so-treated greencake was dried, then calcined in a closed rotary drum calciner, thus practically excluding air, at a temperature of 420° C. for one hour. The resulting calcined pigment was blended with 1750 pounds of blanc fixe and, when so extended, resulted in a bright, clean red pigment, darker in hue than the product of Example 1. Thus, this pigment was of a hue which would have necessitated, in the absence of phosphate, the use of a weight ratio of Hg:Cd of approximately 0.22:1.0 instead of the approximately 0.20:1.0 ratio actually employed.

*Example 17*

In this example, a washed and dried raw pigment was prepared exactly according to the procedure of Example 2. The material was pulverized in the presence of 1.34% dry di-basic ammonium phosphate based on the weight of calcined pigment, and calcined for one hour at a temperature of 460° C. in a rotary drum calciner, in close confinement and with the practical exclusion of air. The resulting calcined product was blended with 3,090 pounds of blanc fixe, to produce a high-quality maroon pigment darker in hue than the product of Example 2. Thus, this pigment was of a hue that would have necessitated, in the absence of phosphate, the use of a weight ratio of Hg:Cd of approximately 0.395:1.00 instead of the 0.375:1.0 ratio actually employed.

While we have described certain procedures for carrying out the objects of our invention, it is to be understood that various modifications falling within the scope of our invention can be made.

Having described our invention, what is claimed is:

1. A pigment composition varying in hue from a light red to a deep maroon consisting essentially of a calcined mercury-cadmium sulfide, the weight ratio of mercury to cadmium varying from 0.20:1.00 to 0.37:1.00, said composition having been prepared by calcining at a temperature of from about 300° to about 500° C. a washed coprecipitate of mercury sulfide and cadmium sulfide containing from about 0.4 to 0.8 percent of $P_2O_5$ by weight on a calcined pigment basis, said co-precipitate of mercury sulfide and cadmium sulfide having been derived from admixing a mercury-containing nitric acid solution and a solution selected from the group consisting of alkali metal and alkaline earth metal sulfides with a cadmium sulfate solution.

2. A process for preparing a mercury-cadmium sulfide pigment wherein the ratio of the mercury to cadmium varies from about 0.20:1.00 to 0.37:1.00 which comprises adding a mercury-containing nitric acid solution to an alkali metal sulfide solution, adding the so-prepared mercury-alkali metal sulfide solution to an aqueous solution of cadmium sulfate, recovery a coprecipitated mercury-cadmium sulfide, thereafter washing said coprecipitate, adding to said washed coprecipitate a minor amount by weight of a phosphate, said minor amount being equivalent to from about 0.4 to 0.8 percent $P_2O_5$ on a calcined pigment basis, and calcining the resulting treated coprecipitate in a substantially confined atmosphere.

3. In a process for preparing a cadmium red pigment wherein an alkali metal sulfide solution is reacted with a cadmium sulfate solution, the improvement which comprises adding a mercury containing nitric acid solution to one of said solutions, bringing the resulting two solutions together simultaneously, recovering a coprecipitated mercury-cadmium sulfide, thereafter washing said coprecipitate, adding a minor amount by weight of a phosphate to said washed coprecipitate, said minor amount being equivalent to from about 0.4 to 0.8 percent $P_2O_5$ on a calcined pigment basis, and calcining the resulting treated coprecipitate in a substantially confined atmosphere to obtain a mercury-cadmium sulfide pigment wherein the ratio by weight of the mercury to cadmium varies from about 0.20:1.00 to 0.37:1.00.

4. A process for preparing a mercury-cadmium sulfide pigment wherein the ratio by weight of the mercury to cadmium varies from about 0.20:1.00 to 0.37:1.00 which comprises adding a mercury-containing nitric acid solution consisting essentially of an aqueous solution of nitric acid and dissolved mercury in a weight ratio of about 2.3–2.4 to 1 to an alkali metal sulfide solution, thereby to prepare a mixed solution containing dissolved mercury sulfide, mixing the so-prepared mercury-alkali metal sulfide solution with an aqueous solution of cadmium sulfate, thereby to form a coprecipitate of mercury-cadmium sulfide, recovering the coprecipitated mercury-cadmium sulfide and thereafter washing and calcining said coprecipitate in a substantially confined atmosphere to obtain said pigment.

5. The process of claim 4 wherein the coprecipitate contains an amount of added elemental sulfur corresponding to less than the stoichiometric equivalent of the mercury employed.

6. A process according to claim 4 wherein the coprecipitate is calcined at a temperature above about 300° C. to about 400° C.

7. A process according to claim 6 wherein the calcined coprecipitate is extended with barium sulfate.

8. A process for preparing an extended mercury-cadmium sulfide pigment wherein the ratio by weight of the mercury to cadmium is within the range of from about 0.20:1.00 to 0.37:1.00, which comprises adding a mercury-containing nitric acid solution consisting essentially of an aqueous solution of nitric acid and dissolved mercury in a weight ratio of about 0.9–3.75 to 1 to an aqueous solution of barium sulfide, thereby to prepare a mixed solution containing dissolved mercury sulfide, adding the so-prepared mercury-barium sulfide solution to an aqueous cadmium sulfate solution thereby to form a coprecipitate consisting essentially of mercury sulfide, cadmium sulfide and barium sulfate, recovery said coprecipitate, and thereafter washing and calcining said coprecipitate in a substantially confined atmosphere to obtain said pigment.

9. A process according to claim 8 wherein the coprecipitate is calcined at a temperature above about 300° C. to about 400° C.

10. A process for preparing a mercury-cadmium sulfide pigment wherein the ratio by weight of the mercury to cadmium varies from about 0.20:1.00 to 0.37:1.00 which comprises adding a mercury-containing nitric acid solution consisting essentially of an aqueous solution of nitric acid and dissolved mercury in a weight ratio of about 0.9–3.75 to 1 to an alkali metal sulfide solution, thereby to prepare a mixed solution containing dissolved mercury sulfide, mixing the so-prepared mercury-alkali metal sulfide solution with an aqueous solution of cadmium sulfate, thereby to form a coprecipitate of mercury-cadmium sulfide, recovering the coprecipitated mercury-cadmium sulfide and thereafter washing and calcining said coprecipitate in a substantially confined atmosphere to obtain said pigment.

11. The process of claim 10 wherein the coprecipitate contains an amount of added elemental sulfur corresponding to less than the stoichiometric equivalent of the mercury employed.

12. A process for preparing an extended mercury-cadmium sulfide pigment wherein the ratio by weight of the mercury to cadmium is within the range of from about 0.20:1.00 to 0.37:1.00, which comprises adding a mercury-containing nitric acid solution consisting essentially of an aqueous solution of nitric acid and dissolved mercury in a weight ratio of about 2.3–2.4 to 1 to an aqueous solution of barium sulfide, thereby to prepare a mixed solution containing dissolved mercury sulfide, adding the so-prepared mercury-barium sulfide solution to an aqueous cadmium sulfate solution thereby to form a coprecipitate consisting essentially of mercury sulfide, cadmium sulfide and barium sulfate, recovering said coprecipitate, and thereafter washing and calcining said coprecipitate in a substantially confined atmosphere to obtain said pigment.

13. A process according to claim 12 wherein the coprecipitate is calcined at a temperature above about 300° C. to about 400° C.

14. A superior pigment composition of exceptionally high tinting strength and color purity, varying in hue from a light red to a deep maroon and consisting essentially of a calcined mercury-cadmium sulfide, said pigment composition having been prepared by calcining in the absence of any additive, in a substantially confined atmosphere and at a temperature below 400° C., a washed co-precipitate of cadmium sulfide and mercury sulfide, said co-precipitate having been derived from adding a mercury-containing nitric acid solution consisting essentially of aqueous nitric acid and dissolved mercury in the range of weight ratios of $HNO_3$:Hg of 0.9:1.00 to 3.75:1.00 to an alkaline sulfide solution possessing an OH:SH ratio of approximately 1:1 thereby to prepare a clear mixed solution containing dissolved mercury sulfide, and intermixing under acidic conditions the so-prepared mercury-alkaline sulfide solution with an aqueous solution of cadmium salt.

15. A superior pigment composition of exceptionally high tinting strength and color purity, varying in hue from a light red to a deep maroon and consisting essentially of a calcined mercury-cadmium sulfide and barium sulfate, said pigment composition having been prepared by calcining in the absence of any additive, in a substantially confined atmosphere and at a temperature below 400° C., a washed co-precipitate of cadmium sulfide, mercury sulfide and barium sulfate, said coprecipitate having been derived from adding a mercury-containing nitric acid solution consisting essentially of aqueous nitric acid and dissolved mercury in the range of weight ratios of $HNO_3$:Hg of 0.9:1.00 to 3.75:1.00 to a barium sulfide solution possessing an OH:SH ratio of approximately 1:1 thereby to prepare a clear mixed solution containing dissolved mercury sulfide, and intermixing under acidic conditions the so-prepared mercury-barium sulfide solution with an aqueous solution of cadmium salt.

16. A process for preparing a mercury-cadmium sulfide pigment wherein the ratio by weight of the mercury to cadmium varies from about 0.20:1.00 to 0.37:1.00 which comprises adding a mercury-containing nitric acid solution consisting essentially of an aqueous solution of nitric acid and dissolved mercury in a weight ratio of about 0.9–3.75 to 1 to an aqueous solution of alkaline sulfide selected from the group consisting of alkali metal sulfides and alkaline earth metal sulfides, thereby to prepare a mixed solution containing dissolved mercury sulfide, mixing the so-prepared mercury-metal sulfide solution with an aqueous solution of cadmium sulfate, thereby to form a coprecipitate selected from the group consisting of mercury-cadmium sulfide and mercury-cadmium sulfide-alkaline earth metal sulfate, recovering said coprecipitate and thereafter washing it and calcining it in a substantially confined atmosphere to obtain said pigment.

References Cited in the file of this patent

UNITED STATES PATENTS

| | | |
|---|---|---|
| 2,850,400 | Long et al. | Sept. 2, 1958 |
| 2,850,401 | Hay | Sept. 2, 1958 |
| 2,878,134 | Gagliano et al. | Mar. 17, 1959 |

OTHER REFERENCES

Rittner et al.: Physical Chemistry, vol. 47, 1943, pages 537–543.